US007002759B2

(12) United States Patent
Hama et al.

(10) Patent No.: US 7,002,759 B2
(45) Date of Patent: Feb. 21, 2006

(54) LENS UNIT FOR MULTIBEAM SCANNING DEVICE

(75) Inventors: Yoshihiro Hama, Saitama-ken (JP); Masakazu Hirano, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/804,130

(22) Filed: Mar. 19, 2004

(65) Prior Publication Data

US 2004/0184165 A1 Sep. 23, 2004

(30) Foreign Application Priority Data

Mar. 20, 2003 (JP) ............................ 2003-078157

(51) Int. Cl.
*G02B 7/02* (2006.01)

(52) U.S. Cl. ....................... 359/820; 359/819; 359/811

(58) Field of Classification Search ................ 359/820, 359/819, 811; 348/202, 195
See application file for complete search history.

(56) References Cited

U.S. PATENT DOCUMENTS

| | | | | |
|---|---|---|---|---|
| 4,723,833 A * | 2/1988 | Yamada | 359/820 |
| 6,198,562 B1 | 3/2001 | Hayashi et al. | 359/204 |
| 6,867,848 B1 * | 3/2005 | Ebinuma et al. | 355/75 |
| 2002/0163741 A1 * | 11/2002 | Shibazaki | 359/819 |
| 2003/0179470 A1 * | 9/2003 | Sudoh | 359/811 |

FOREIGN PATENT DOCUMENTS

| | | |
|---|---|---|
| JP | 6-94957 | 4/1994 |
| JP | 6-130267 | 5/1994 |
| JP | 7-191247 | 7/1995 |
| JP | 7-225953 | 8/1995 |
| JP | 8-300725 | 11/1996 |
| JP | 11-38344 | 2/1999 |
| JP | 2000-75226 | 3/2000 |
| JP | 2000-249948 | 9/2000 |
| JP | 2001-4941 | 1/2001 |
| JP | 2001-194605 | 7/2001 |

OTHER PUBLICATIONS

English Language Abstract of JP 6-130267.
English Language Abstract of JP 6-94957.
English Language Abstract of JP 7-225953.
English Language Abstract of JP 11-38344.
English Language Abstract of JP 2000-75226.

* cited by examiner

*Primary Examiner*—Jordan M. Schwartz
*Assistant Examiner*—Jessica Stultz
(74) *Attorney, Agent, or Firm*—Greenblum & Bernstein, P.L.C.

(57) ABSTRACT

A lens unit for a scanning device includes a frame having a hollow cylindrical shape, the frame being defined with a lens contact portion therein, a lens accommodated in the frame contacting the lens contact portion, and a retainer accommodated in the frame to retain the lens in position, the retainer having a hollow cylindrical shape, one end side face of the retainer contacting a peripheral portion of the lens received by the frame, an other end portion of the retainer being secured to the frame so that the retainer presses the lens toward the lens contact portion of the frame to fix the lens to the frame. Deformation of the frame, lens and retainer due to the load generated as the retainer presses the lens absorbs deformation of the frame, lens and retainer due to temperature change at least within a predetermined temperature range.

7 Claims, 4 Drawing Sheets

LENS UNIT FOR MULTIBEAM SCANNING DEVICE

BACKGROUND OF THE INVENTION

The present invention relates to a lens unit for a multibeam scanning device, which simultaneously scans a plurality of light beams emitted by multiple light emitting elements on a scan target surface (e.g. the surface of a photoconductive drum) by dynamically deflecting the light beams by use of a deflecting system.

Scanning devices for scanning a light beam emitted by a light emitting element on a scan target surface by dynamically deflecting the light beam by a deflecting system have been widely known. However, image formation speed of such single-beam scanning devices (forming images by scanning only one light beam on the scan target surface) is generally low. For increasing the image formation speed, multibeam scanning devices, which simultaneously scan a plurality of light beams emitted by multiple light emitting elements on the scan target surface by dynamically deflecting the light beams by use of a deflecting system, have recently been proposed (e.g., Japanese Patent Provisional Publication P2001-194605A) and have been in practical use widely.

A lens holding mechanism capable of preventing distortion of a lens by absorbing deformation of the lens caused by temperature variation has been proposed in Japanese Patent Provisional Publication No. HEI 07-191247 (pages 2–5, FIGS. 1, 6 and 9). The lens holding mechanism places elastic material between the lens and a holding frame which holds the lens so that temperature-dependent variations (especially, lens deformation caused by thermal expansion at high temperatures) will be absorbed by the elastic material. The elastic material prevents the lens distortion by absorbing the lens deformation mainly in the radial direction.

The patent document Japanese Patent Provisional Publication No. HEI 07-191247 also proposes a countermeasure against lens deformation in the thrust direction, in which lens distortion caused by the lens deformation in the thrust direction is avoided by fixing the lens by vertically sandwiching the lens between the holding frame and a lens retainer, by bonding the elastic material to the lens and vertically sandwiching only the elastic material between the holding frame and the lens retainer, etc.

In these multibeam scanning devices, it is essential to maintain each distance between beam spots (formed on the scan target surface by the light beams) with high precision corresponding to a prescribed desired resolution throughout the scanning period. In other words, relative positions among optical paths of the light beams have to be maintained substantially constant. However, when an expensive one-chip (integrated) multibeam laser diode unit or a multichip laser diode unit is employed for the multibeam scanning device, it is impossible in many cases to maintain the distances among the beam spots formed on the scan target surface (measured in the scanning direction) since each component of the chip moves slightly due to temperature variation.

Further, the position of the collimating lens employed in the multibeam scanning device, as the outlet of the laser diode unit for the light beam, has an important effect on the position of the beam spot on the scan target surface. For example, if the collimating lens slightly moves relative to the light beam emitted from the laser diode, the beam spot on the scan target surface moves three to ten times as long as the displacement of the collimating lens. Therefore, in conventional multibeam scanning devices, a sensor is generally placed at a position equivalent to the scan target surface and each distance between the beam spots is monitored and fed back, that is, each distance between the beam spots is maintained to be constant by means of a closed-loop system.

However, providing the multibeam scanning device with such a feedback control mechanism (closed-loop control mechanism) leads to upsizing, complication and high cost of the device.

In the method proposed in Japanese Patent Provisional Publication No. HEI 07-191247, the lens are vertically sandwiched between the holding frame and the lens retainer in order to resolve the lens deformation problem in the thrust direction, each component of the lens holding mechanism contracts in low ambient temperatures, by which clearance occurs among the components and the lens moves relative to the holding frame. Therefore, in the highly sensitive multibeam scanning devices, the lens holding mechanism having such composition can not successfully maintain the beam spot intervals on the scan target surface (measured in the scan direction) to be constant.

Similarly, in the method of Japanese Patent Provisional Publication No. HEI 07-191247 bonding the elastic material to the lens and vertically sandwiching only the elastic material between the holding frame and the lens retainer as the countermeasure against lens deformation in the thrust direction, injecting adhesives between the small-sized lens installed in the multibeam scanning device and the elastic material is difficult, and the increase of steps in the manufacturing process leads to high cost. Further, once the elastic material is bonded to the lens, the lens cannot be separated from the elastic material and thus both have to be discarded when quality of one of them deteriorates. Further, in cases where such adhesives are used, thermal expansion of the adhesives accompanying temperature variation might have ill effects on the lens.

SUMMARY OF THE INVENTION

The present invention is advantageous in that an improved lens unit for a multibeam scanning device is provided. Employing the lens unit, the multibeam scanning device can maintain the beam spot intervals on the scan target surface with high accuracy even if the ambient temperature changes, without the need of the mechanism for monitoring the beam spot intervals and executing the feedback control and without the use of adhesives for fixing the optical system to the frame or lens holding mechanism.

According to the invention, there is provided a lens unit for a scanning device, which includes a frame having a hollow cylindrical shape, the frame being defined with a lens contact portion therein, a lens accommodated in the frame with contacting the lens contact portion defined in the frame, and a retainer accommodated in the frame to retain the lens in position, the retainer having a hollow cylindrical shape, one end side face of the retainer contacting a peripheral portion of the lens received by the frame, an other end portion of the retainer being secured to the frame so that the retainer presses the lens toward the lens contact portion of the frame to fix the lens to the frame. In the lens unit constructed as above, deformation of the frame, lens and retainer due to the load generated as the retainer presses the lens absorbs deformation of the frame, lens and retainer due to temperature change at least within a predetermined temperature range so that a fixed status of the lens with respect to the frame is not released regardless of the temperature change within the predetermined temperature range.

Optionally, the scanning device is a multibeam scanning device which simultaneously scans a plurality of light beams emitted by multiple light emitting elements on a scan target surface by dynamically deflecting the light beams by use of a deflecting system, the lens unit being used for each of the multiple light beams.

Further optionally, the other end portion of the retainer is formed of a screw thread portion, and where an inner surface of the frame at a portion facing the other end portion of the retainer is formed of a screw thread portion to engage with the screw thread portion of the retainer.

Still optionally, the lens has a linear expansion coefficient $\rho_1$, a longitudinal elastic modulus $E_1$, and a cross-sectional area $S_1$ orthogonal to an optical axis direction, the frame has a linear expansion coefficient $\rho_2$, a longitudinal elastic modulus $E_2$, and a cross-sectional area $S_2$ orthogonal to the optical axis direction, in which the optical system is installed, and the retainer has a linear expansion coefficient $\rho_3$, a longitudinal elastic modulus $E_3$, and a cross-sectional area $S_3$ orthogonal to the optical axis direction, the retainer applying the lens with a load P. The lens unit may be configured to satisfy the following condition:

$$\Delta t\{\rho_2 L_2 - (\rho_1 L_1 + \rho_3 L_3)\} < P\left(\frac{L_1}{E_1 S_1} + \frac{L_2}{E_2 S_2} + \frac{L_3}{E_3 S_3}\right),$$

wherein, $L_1$ represents a length of the lens from a contact point of the lens and the lens contact portion of the frame to a contact point of the lens and the retainer in the optical axis direction at a predetermined temperature $t_0$, $L_2$ represents a length of the frame from the contact point of the lens and the lens contact portion of the frame to a lens side end of the other end portion of the retainer at a predetermined temperature $t_0$, $L_3$ represents a length of the retainer from the contact point of the lens and the retainer to the lens side end of the other end portion of the retainer at a predetermined temperature $t_0$, $L_2 = L_1 + L_3$, and $\Delta t$ represents a change of temperature with respect to the predetermined temperature.

In a particular case, the materials and lengths of the frame, lens and retainer are determined to satisfy a condition: $\rho_2 L_2 = \rho_1 L_1 + \rho_3 L_3$.

Optionally, the predetermined temperature range is a range from −20° C. to +70° C.

Still optionally, when the predetermined temperature to is closer to the upper end of the predetermined temperature range than the lower end thereof, and $\rho_2 L_2 < \rho_1 L_1 + \rho_3 L_3$. On the contrary, when the predetermined temperature to is closer to the lower end of the predetermined temperature range than the upper end thereof, and $\rho_2 L_2 > \rho L_1 + \rho_3 L_3$.

BRIEF DESCRIPTION OF THE ACCOMPANYING DRAWINGS

DESCRIPTION OF THE EMBODIMENTS

Figure 1:
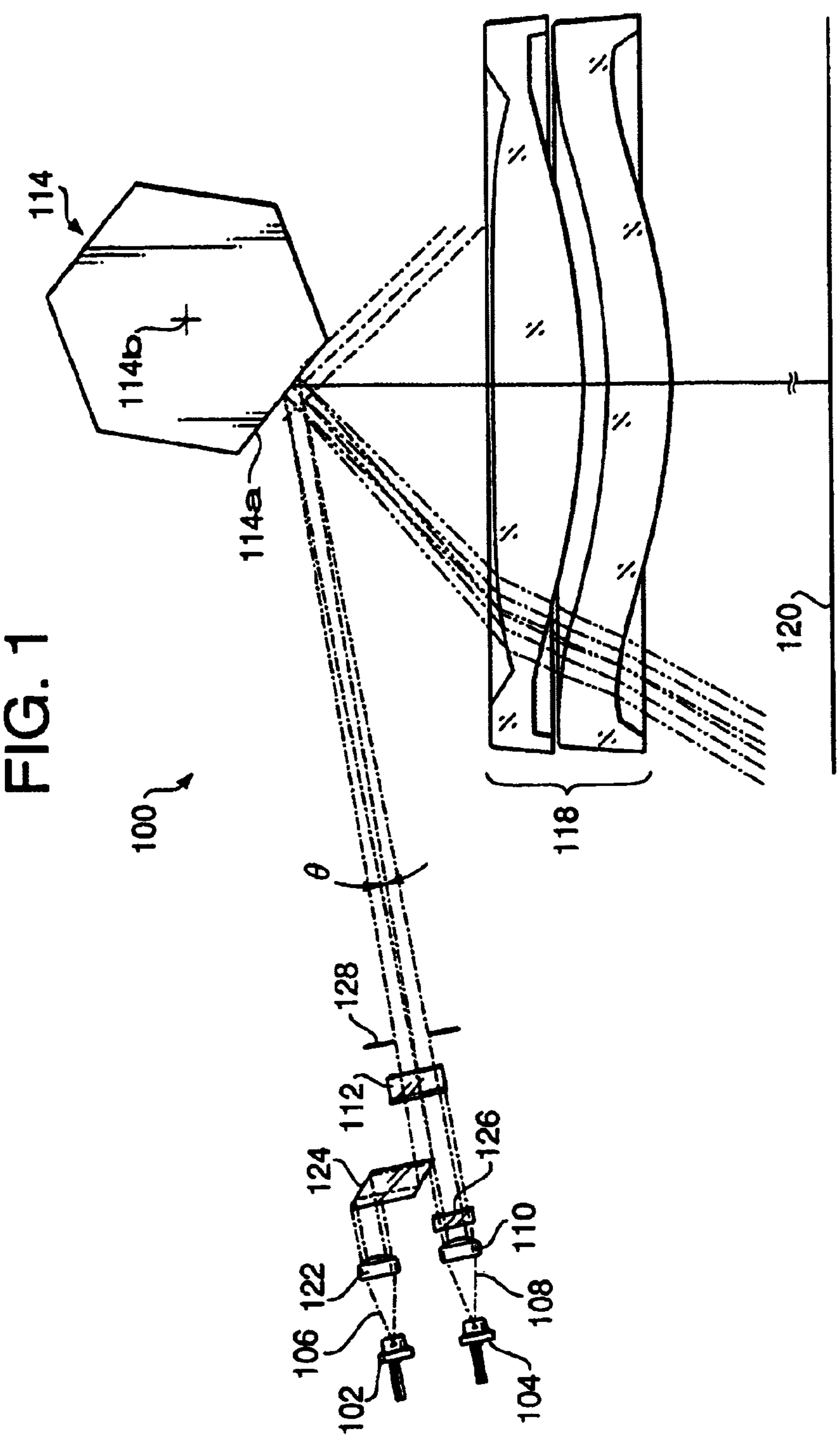
FIG. 1 is a schematic diagram showing the optical composition of a multibeam scanning device in accordance with an embodiment of the present invention.

Referring now to the drawings, a description will be given in detail of preferred embodiments in accordance with the present invention.

FIG. 1 is a schematic diagram showing the optical composition of a multibeam scanning device 100 in accordance with an embodiment of the present invention. As shown in FIG. 1, the multibeam scanning device 100 includes first and second light emitting elements 102 and 104. The first and second light emitting elements 102 and 104 (e.g. laser diodes) emit first and second light beams 106 and 108, respectively. In this embodiment, the first and second light beams 106 and 108 are emitted from the first and second light emitting elements 102 and 104 to be on a plane orthogonal to the rotation axis of a polygon mirror which will be described below, and preferably, to be parallel with each other.

The first light beam 106 emitted by the first light emitting element 102 is collimated by a collimating lens 122 into a parallel light beam, and is incident on a prism 124. The prism 124 shifts the optical paths of the first light beam 106 toward the second light beam 108, which is emitted by the second light emitting element 104. The first light beam 106 passes through a cylindrical lens 112 and a slit 128, and is incident upon a reflecting surface 114*a* of the polygon mirror 114. The cylindrical lens 112 has refractive power for converging the light beam only in the direction parallel to the rotation axis 114*b* of the polygon mirror 114 (auxiliary scanning direction) so that the light beam is converged in the auxiliary scanning direction in the proximity of the reflecting surface 114*a*.

The first light beam 106 is then reflected by the reflecting surface 114*a*, passes through an fθ lens 118, and is focused on the scan target surface 120. According to the rotation of the polygon mirror 114 at a constant revolving speed, a beam spot of the first light beam 106 focused on the scan target surface 120 moves on the scan target surface 120 at a substantially constant speed. The direction of the movement of the first beam spot 106 on the scan target surface will be referred to as a "main scanning direction". A direction perpendicular to the main scanning direction and parallel to the scan target surface 120 will be referred to as an "auxiliary scanning direction."

Incidentally, the "main scanning direction" can be defined not only on the scan target surface 120 but also at any point on the optical path of the light beam, as a direction regarding the main scan of the light beam, that is, the direction in which the light beam is dynamically deflected by the polygon mirror 114 or the direction in which the light beam moves according to the revolution of the polygon mirror 114. The "auxiliary scanning direction" can also be defined at any point on the optical path of the light beam as a direction orthogonal to the main scanning direction.

Meanwhile, the second light beam 108 emitted from the second light emitting element 104 is collimated by a collimating lens 110 into a parallel light beam, passes through a position adjustment element 126, the cylindrical lens 112, the slit 128, and is incident upon the polygon mirror 114. It should be noted that the second light beam 108 incident on substantially the same incident position on the reflecting surface 114*a* as the first light beam 106. Therefore, the first and second light beams 106 and 108 are not exactly parallel with each other on the polygon-mirror side of the prism 124, rather a tilt angle θ is formed therebetween in the revolving direction of the polygon mirror 114 as shown in FIG. 1.

The second light beam 108 reflected by the reflecting surface 114*a* of the polygon mirror 114 further proceeds to pass through the fθ lens 118 and is then incident upon the scan target surface 120 to form a beam spot which moves in the main scanning direction.

On the optical path of the second light beam 108 between the collimating lens 110 and the cylindrical lens 112, a position adjustment element 126 for adjusting the position of the second light beam 108 is placed. The position adjustment element 126 is a wedge prism which has a wedge-shaped sectional form on a plane parallel to its optical axis, for example. In this embodiment, the height of incident position of the second light beam 108 on the cylindrical lens 112 is adjusted by adjusting the placement of the position adjustment element 126. Here, the "height" means a position in the auxiliary scanning direction. The incident height of the second light beam 108 is adjusted to be a preset distance (height) different from that of the first light beam 106, by which the second light beam 108 incident on and reflected by the reflecting surface 114*a* of the polygon mirror 114 has a slight tilt angle with the first light beam 106. In other words, the position adjustment element 126 adjusts the angle (in the auxiliary scanning direction) of the second light beam 108 incident on the polygon mirror 114. As a result of the angle adjustment, the second light beam 108 scans on a scan line on the scan target surface that is a preset interval apart in the auxiliary scanning direction from a scan line formed by the first light beam 106. Incidentally, the angle adjustment (adjustment of the incident angle of the second light beam 108 on the polygon mirror 114 in the auxiliary scanning direction by use of the position adjustment element 126) is made as a step in the manufacturing process of the multibeam scanning device 100.

As described above, the multibeam scanning device 100 includes the slit 128 which is placed between the cylindrical lens 112 and the polygon mirror 114. The slit 128 has a narrow opening extending in a direction parallel to a plane orthogonal to the rotation axis of the polygon mirror 114. The shapes (beam widths, etc.) of the first and second light beams 106 and 108 are regulated by the narrow opening of the slit 128 so as to have substantially identical sectional forms, by which effective beams of the first and second light beams 106 and 108 are formed.

Figure 2:
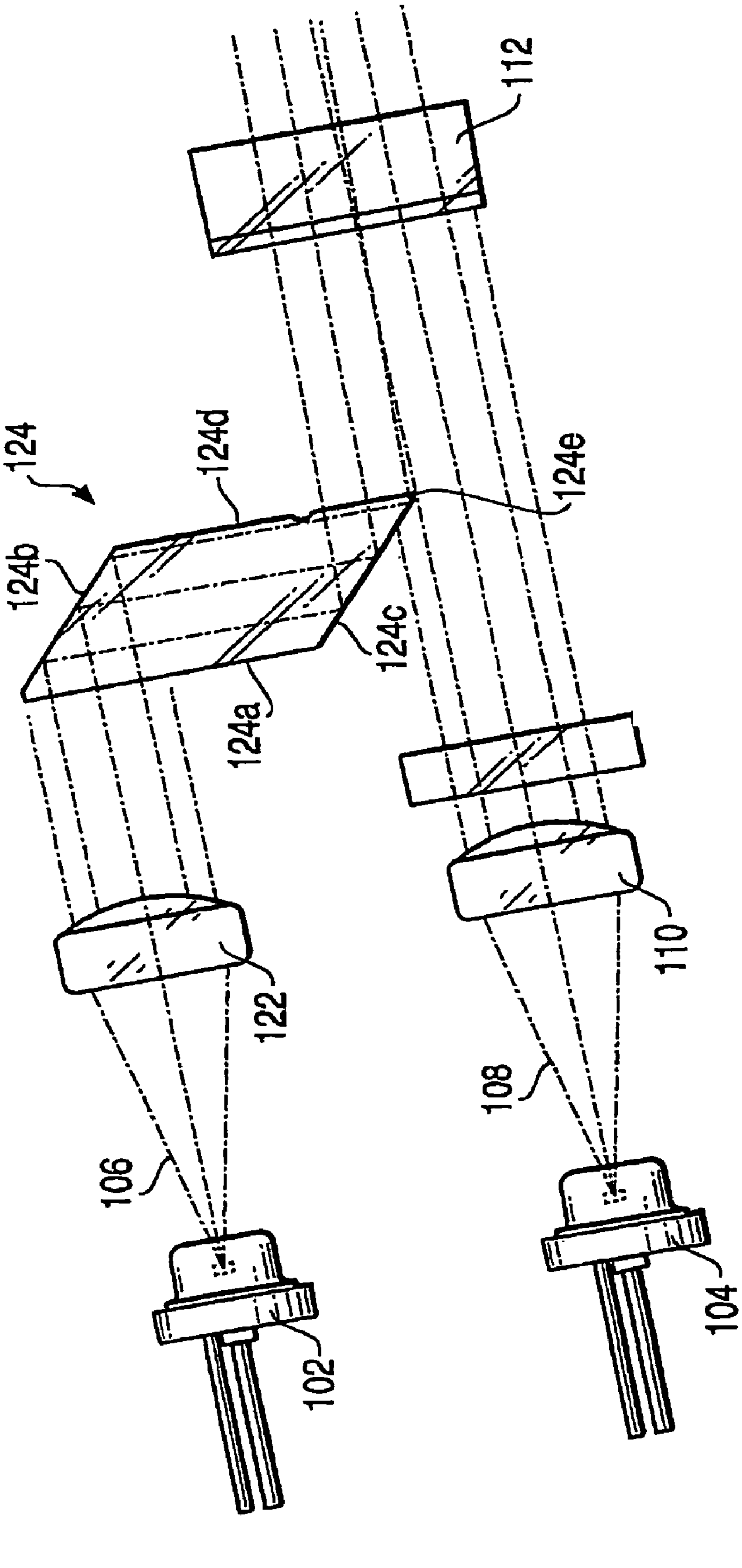
FIG. 2 is an enlarged view showing part of the multibeam scanning device around a prism.

FIG. 2 is an enlarged view showing part of the multibeam scanning device 100 around the prism 124. As shown in FIG. 2, the prism 124 has an entrance surface 124*a* through which the first light beam 106 enters the prism 124, first and second reflecting surfaces 124*b* and 124*c* coated with reflective layers for reflecting the first light beam 106, and an emerging surface 124*d* from which the first light beam 106 is emeerged.

The first light beam 106 enters the prism 124 through part of the entrance surface 124*a* including the angular part formed by the entrance surface 124*a* and the first reflecting surface 124*b*. The entrance surface 124*a* may be coated with an antireflective layer in order to promote the transmission of the first light beam 106.

After entering the prism 124, the first light beam 106 is reflected by the first reflecting surface 124*b* (having a total reflection coating or reflective coating thereon) toward the second reflecting surface 124*c*. The first light beam 106 is reflected again by the second reflecting surface 124*c* and then emerges from the emerging surface 124*d* toward the polygon mirror 114.

In another angular part formed by the second reflecting surface 124*c* and the emitting surface 124*d*, a chamfered part 124*e* is formed. The first light beam 106 reflected by the first reflecting surface 124*b* is incident not only on the second reflecting surface 124*c* but also on the chamfered part 124*e*. In this case, if the edge part of the second reflecting surface 124*c* nearby the chamfered part 124*e* is a mirror surface, there is a possibility that the first light beam 106 passes through or is reflected by the edge part toward a particular direction and affects the image formation; however, the surface of the chamfered part 124*e* is processed so as to defuse light incident thereon. For example, the chamfered part 124*e* of this embodiment is formed to have a frosted or ground surface having surface roughness of approximately #400–#800. Therefore, the first light beam 106 incident on the chamfered part 124*e* is scattered around, without such transmission or reflection causing high light intensity in a particular direction.

An edge part of the second reflecting surface 124*c* adjoining the emitting surface 124*d* is placed in the optical path of the second light beam 108. Therefore, part of the second light beam 108 is incident on the edge part of the second reflecting surface 124*c*. Since the second reflecting surface 124*c* is provided with a total reflection coating or reflective coating as mentioned above, the second light beam 108 incident on the edge part is reflected away and does not travel toward the polygon mirror 114. In other words, the edge part of the second reflecting surface 124*c* blocks a small part of the second light beam 108.

As above, the edge part of the second reflecting surface 124*c* reflects the first light beam 106 toward the polygon mirror 114 while blocking a small part of the second light beam 108. Thus, on the light emerging side of the prism 124, the first light beam 106 emerges from the area blocking the second light beam 108 and consequently, the first and second light beams 106 and 108 adjoin each other with no gap at the emerging surface 124*d*. As mentioned before, the first and second light beams 106 and 108 incident upon the polygon mirror 114 have a slight tilt angle θ (in the revolving direction of the polygon mirror 114) therebetween. Since the first and second light beams 106 and 108 adjoin each other with no gap at the emitting surface 124*d* of the prism 124 (i.e., the interval between the two light beams is extremely small), the tilt angle θ between the two light beams also becomes extremely small.

Figure 3A:
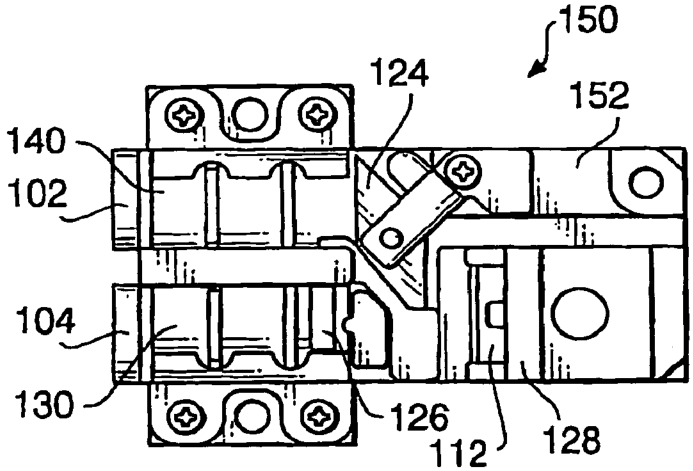
FIG. 3A is a top view showing an example of a light source unit that is employed for the multibeam scanning device.
Figure 3B:
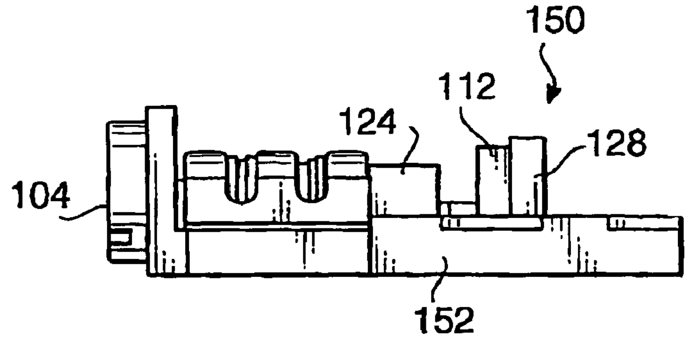
FIG. 3B is a side view of the light source unit of FIG. 3A.
Figure 3C:
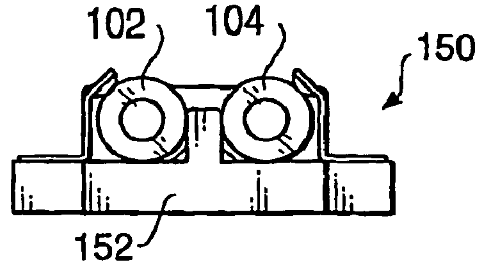
FIG. 3C is a front view of the light source unit of FIG. 3A.

The multibeam scanning device 100 shown in FIG. 1 can be manufactured by, for example, preparing a light source unit having the first and second light emitting elements 102 and 104, etc. mounted on a support or frame, and thereafter installing the light source unit in the cabinet of the multibeam scanning device 100. FIGS. 3A, 3B and 3C are a top view, a side view and a front view showing an example of such a light source unit 150, respectively. The light source unit 150 includes a support (substrate) 152 on which the first and second light emitting elements 102 and 104, lens units 130 and 140, the position adjustment element 126, the prism 124, the cylindrical lens 112 and the slit 128 are mounted.

The first and second light emitting elements 102 and 104 are mounted on the support 152 so that they can emit light beams substantially on the same plane and almost in the same direction, that is, light beams almost parallel with each other. Such a structure of mounting the light emitting elements 102 and 104 is convenient in that electric circuits (unshown) for driving the light emitting elements can be placed on the back of the light emitting elements (opposite to the emitting side of the light emitting elements) as a single unit.

Figure 4:
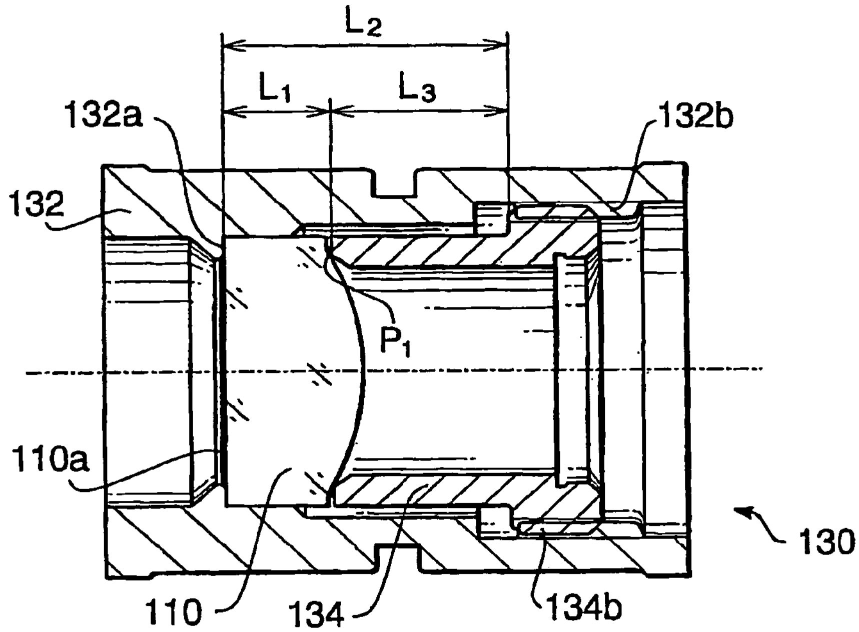
FIG. 4 is a cross-sectional view showing a cross section around the optical axis of a lens unit which is mounted on a support of the light source unit.

FIG. 4 is a cross-sectional view showing a cross section around the optical axis of the lens unit 130 which is mounted on the support 152 of the light source unit 150. The lens unit 130, placed between the second light emitting element 104 and the position adjustment element 126, includes the collimating lens 110, a lens support frame 132 having a cylindrical shape for supporting the collimating lens 110, and a lens retainer ring 134 having a cylindrical shape for pressing and retaining the collimating lens 110 inside the lens support frame 132. In the embodiment, the lens unit 140 mounted on the support 152 of the light source unit 150 has the similar structure, and thus detailed description thereof is omitted here.

In the following, a process for assembling the lens unit 130 will be explained in detail.

First, the lens support frame 132 is held so that its positioning protrusion 132*a* (formed on its interior surface) faces downward and its optical axis is oriented in the vertical direction. Subsequently, the collimating lens 110 is dropped and set in the lens support frame 132 letting its surface 110*a* contact the positioning protrusion 132*a* of the lens support frame 132.

The interior surface of the lens support frame 132 is provided with a screw thread part 132*b*. Meanwhile, the exterior surface of the lens retainer ring 134 is provided with another screw thread part 134*b* to engage with the screw thread part 132*b*. As the lens retainer ring 134 is screwed into the lens support frame 132, the front face of the lens retainer ring 134 approaches the collimating lens 110, and eventually the collimating lens 110 is sandwiched between the positioning protrusion 132*a* and the front face of the lens retainer ring 134. By further screwing the lens retainer ring 134, the collimating lens 110 pressed by the front face of the lens retainer ring 134 is fixed in the lens support frame 132 and thereby the assembly of the lens unit 130 is completed.

The collimating lens 110 employed for this embodiment is implemented by, for example, a glass lens formed of BK7 or quartz (silica) having a linear expansion coefficient $\rho_1$, a longitudinal elastic modulus $E_1$, and a cross-sectional area (taken along a plane perpendicular to the optical axis thereof, and including a peripheral portion thereof) of approximately $S_1$. The lens support frame 132 is implemented with, for example, a brass frame having a linear expansion coefficient $\rho_2$, a longitudinal elastic modulus $E_2$, and a cross-sectional area (which is an annular area) of approximately $S_2$ orthogonal to the optical axis. It should be noted that the lens support frame 132 has different cross-sectional shapes depending on a position in the longitudinal direction, and the area $S_2$ represents a mean value of the cross-sectional areas within an $L_2$ part of the lens support frame 132. The lens retainer ring 134 is implemented by, for example, an aluminium ring having a linear expansion coefficient $\rho_3$, a longitudinal elastic modulus $E_3$, and a cross-sectional area of approximately $S_3$ orthogonal to the optical axis. It should be noted that the lens retainer ring 134 also has different cross-sectional shapes depending on a position in the longitudinal direction, and the area $S_3$ represents a mean value of the cross-sectional areas within an $L_3$ part of the lens retainer ring 134.

When the assembly of the lens unit 130 is completed, the length from the contacting surface of the positioning protrusion 132*a* (contacting the surface 110*a* of the collimating lens 110) to a contact point $P_1$ of the collimating lens 110 (contacting the lens retainer ring 134) becomes $L_1$, and the length from the contact point $P_1$ to an end (i.e., the left-hand side end in FIG. 4) of the engaging part where the screw thread part 132*b* engages with the screw thread part 134*b* on the collimator-lens side becomes $L_3$. Therefore, the distance from the contacting surface of the positioning protrusion 132*a* to the end of the engaging part becomes $L_2=L_1+L_3$. Hereinafter, an expression "$L_2$ part of the lens support frame 132" means a part of the lens support frame 132 between the contacting surface of the positioning protrusion 132*a* and the end of the engaging part. "$L_1$ part of the collimating lens 110" and "$L_3$ part of the lens retainer ring 134" are also defined similarly. That is, $L_1$ part, $L_2$ part and $L_3$ part refer to portions of respective elements, while $L_1$, $L_2$ and $L_3$ refer to lengths thereof. It should be noted that the lengths $L_1$, $L_2$ and $L_3$ are those when no pressure is applied and the circumferential temperature is a reference temperature $t_0$, which is 20° C. in the embodiment.

The lens unit 130 is designed (i.e., material and size of each member is determined) to satisfy the following condition (1) in its completed state when the ambient temperature t is within a range between −20° C. and 70° C.

$$\Delta t\{\rho_2 L_2 - (\rho_1 L_1 + \rho_3 L_3)\} < P\left(\frac{L_1}{E_1 S_1} + \frac{L_2}{E_2 S_2} + \frac{L_3}{E_3 S_3}\right) \quad (1)$$

where, $L_2=L_1+L_3$, and $\Delta t=t-t_0$.

The following TABLE 1 shows a numerical configuration of each component of the lens unit 130. In TABLE 1, lengths and areas are those at the ambient temperature is 20° C., and no pressure is applied.

TABLE 1

| | length L (mm²) | cross-section area S (mm²) | longitudinal elastic modulus (Kgf/mm²) | linear expansion coefficient (×10⁻⁵/° C.) |
|---|---|---|---|---|
| $L_1$ part of Collimating Lens | 3 | 25 | $8 \times 10^4$ | 0.1 |
| $L_2$ part of Lens Support Frame | 10 | 25 | $10 \times 10^4$ | 1.62 |
| $L_3$ part of Lens Retainer Ring | 7 | 18 | $7 \times 10^4$ | 2.3 |

The left side of the inequality (1) indicates the difference of the lengths between the length $L_2$ and the sum of the lengths $L_1$ and $L_3$ in the optical axis direction due to the temperature variation.

For example, when the ambient temperature increases by 20° C. in the case of Table 1, the change ΔL of the length L of each part ($L_1$ part of the collimating lens 110, $L_2$ part of the lens support frame 132, $L_3$ part of the lens retainer ring 134) caused by the temperature increase of 20° C. becomes $0.06\times10^{-3}$ [mm], $3.24\times10^{-3}$ [mm], and $3.22\times10^{-3}$ [mm], respectively. In this example, the increase of the lengths of the parts ($L_1$ part and $L_3$ part) of the collimating lens 110 and the lens retainer ring 134 added together in the optical axis direction due to thermal expansion ($\Delta t(\rho_1 L_1+\rho_3 L_3)$) is slightly greater than the increase of the length of the $L_2$ part of the lens support frame 132 in the optical axis direction due to thermal expansion ($\Delta t \times \rho_2 L_2$). In this case, the $L_1$ part of the collimating lens 110 and the $L_3$ part of the lens retainer ring 134 both expanding are locked up in the $L_2$ part of the lens retainer ring 132 (expanding by almost the same length) in a way canceling out their movement, by which the displacement of the collimating lens 110 in the lens support frame 132 is prevented.

When the ambient temperature decreases, the decrease of the lengths of the parts ($L_1$ part and $L_3$ part) of the collimating lens 110 and the lens retainer ring 134 added together in the optical axis direction due to thermal contraction ($\Delta t(\rho_1 L_1 + \rho_3 L_3)$) becomes slightly greater than the change of the length of the $L_2$ part of the lens support frame 132 in the optical axis direction due to thermal contraction ($\Delta t \times \rho_2 L_2$). In this case, the $L_1$ part of the collimating lens 110 and the $L_3$ part of the lens retainer ring 134 both contracting are locked up in the $L_2$ part of the lens retainer ring 132 (contracting by almost the same length) by almost constant fastening force, by which the occurrence of clearance between components can be avoided and the displacement of the collimating lens 110 in the lens support frame 132 is prevented. Incidentally, the length L of each component shown in the Table 1 is a value when the ambient temperature is 20° C.

For example, when the ambient temperature decreases by 20° C. in the case of TABLE 1, the change ΔL of the length L of each part ($L_1$ part of the collimating lens 110, $L_2$ part of the lens support frame 132, $L_3$ part of the lens retainer ring 134) caused by the temperature decrease of 20° C. is similar to that in the case where the temperature increase, except that each part contracts by the amount. In this example, a clearance may be formed between the right-hand side of the $L_1$ part and the left-hand side of the $L_3$ part.

According to the embodiment, however, since the sum of the elastic deformation of the parts ($L_1$, $L_2$ and $L_3$ parts) is greater than the clearance which is formed due to the temperature decrease, the fastening load is retained, and the displacement of the collimating lens 110 in the lens support frame 132 is prevented.

The right side of the inequality (1) indicates the sum of elastic deformations [mm] of the $L_1$ part of the collimating lens 110, $L_2$ part of the lens support frame 132 and $L_3$ part of the lens retainer ring 134 in the optical axis direction caused by a fastening load P of the lens retainer ring 134 on the collimating lens 110.

Specifically, when the fastening load P ($P \geqq 0$) is generated by fastening the lens retainer ring 134, the $L_1$ part and $L_3$ part elastically contract, while the $L_2$ part elastically expands.

For example, the elastic deformation ΔL' of each part ($L_1$ part of the collimating lens 110, $L_2$ part of the lens support frame 132, $L_3$ part of the lens retainer ring 134) caused by a load (fastening load P: 100 [N]) in the case of TABLE 1 becomes $1.5\times10^{-4}$ [mm], $4.2\times10^{-4}$ [mm] and $5.5\times10^{-4}$ [mm], respectively. Accordingly, the right side of the inequality (1) becomes $1.12\times10^{-3}$ [mm], which is greater than the left side of the inequality (1) in the above example (i.e., Δt=20°). Therefore, in this case, the deformation of the parts (L1, L2 and L3) can be absorbed by the elastic deformation due to the fastening load P, and the displacement of the collimating lens 110 in the lens support frame 132 is prevented.

The elastic deformation of each component gets larger as the load gets heavier. Therefore, as the fastening load P gets larger, fastening force of the elastically deformed components becomes larger, by which relative position of each component becomes more fixed and stabilized. Consequently, the displacement of the collimating lens 110 in the lens support frame 132 is prevented. Incidentally, the fastening load P is maintained below a load level that can excessively deform the collimating lens 110 and deteriorate optical performance of the collimating lens 110.

When the temperature drops, the $L_1$ part of the collimating lens 110 and the $L_3$ part of the lens retainer ring 134 added together contract slightly more than the $L_2$ part of the lens support frame 132, by which clearance tends to occur among the components and the displacement of the collimating lens 110 in the lens support frame 132 becomes a possibility. However, in the case where the lens unit 130 satisfies the condition (1), the change of the length of the $L_2$ part of the lens support frame 132 in the optical axis direction caused by the temperature drop minus the sum of the change of the lengths of the $L_1$ part of the collimating lens 110 and the change of the $L_3$ part of the lens retainer ring 134 in the optical axis direction [mm] caused by the same temperature drop is smaller than the sum of elastic deformations of the collimating lens 110, the lens support frame 132 and the lens retainer ring 134 caused by the fastening load P. Therefore, even when the clearance tends to be generated between the collimating lens 110 and the lens retainer ring 134 due to the temperature change, if the amount of deformation due to the temperature drop is less than the amount of deformation due to the fastening load P, each component tends to restore its original shape as the clearance increases, and as a result, the lens retainer ring 134 keeps applying the fastening load P to the collimating lens. Therefore, the displacement of the collimating lens can be prevented.

In the above description, the lengths and coefficients are determined such that the clearance between the collimating lens 110 and the lens retainer ring 134 tends to be formed when the temperature drops (i.e., $\Delta t<0$). It can be understood easily that, when the relationship of the lengths and coefficients is opposite (i.e., when the clearance between the collimating lens 110 and the lens retainer ring 134 tends to be formed when the temperature increases (i.e., $\Delta t>0$)), the displacement of the collimating lens 110 can be prevented.

Therefore, the effect of deformations of the components due to deformation (caused by temperature change) is absorbed by the elastic deformations of the components.

As above, the collimating lens 110, the lens support frame 132 and the lens retainer ring 134 are not practically affected by the change of temperature and no displacement of the collimating lens 110 occurs in the lens support frame 132. The same applies to the collimating lens 122 of the lens unit 140 for the first light beam 106. By the prevention of the displacement of the collimating lenses 110 and 122 in the lens units 130 and 140, the relative positions of the optical paths of the first and second light beams 106 and 108 are maintained substantially fixed and thereby the interval of the beam spots formed on the scan target surface 120 (beam spot interval in the auxiliary scanning direction, etc.) can be maintained constant.

It should be noted that, if the material and length of each of the parts $L_1$, $L_2$ and $L_3$ are appropriately determined so that the difference between the expansion/contraction amount due to the temperature variation of the $L_2$ part and the sum of the expansion/contraction amounts due to the temperature variation of the $L_1$ part and $L_3$ part is smaller, the deformation amount due to the fastening load P can be decreased. That is, the fastening load P can be set smaller. As the fastening load P is set smaller, possible deformation of the collimating lens 110 due to the fastening force of the lens retainer ring 134 can be made smaller.

In particular, when the condition (2):

$$\rho_2 L_2 = \rho_1 L_1 + \rho_3 L_3 \quad (2)$$

is satisfied, the clearance between the collimating lens will not be formed, and thus, the fastening load P can be minimized.

As described above, in the lens unit in accordance with the embodiment of the present invention, the effect of deformations of the components due to expansion/contraction caused by temperature variation can be absorbed by the elastic deformations of the components, by which the displacement of the collimating lenses 110, 122 due to temperature variation can be prevented. Therefore, the intervals of the beam spots formed on the scan target surface measured in each scanning direction can be maintained with high precision needing only the initial positioning in the assembly process. Consequently, the need of installing the feedback control mechanism in the multibeam scanning device for maintaining the beam spot intervals is eliminated, and thereby miniaturization, simplification and cost reduction of the multibeam scanning device are realized. Further, the manufacturing process of the lens unit can be simplified since the manufacturing steps using adhesives become unnecessary When the reference temperature $t_0$ is relatively high, that is, when $\Delta t$ tends to be negative, it is preferable that the following condition is satisfied:

$$\rho_2 L_2 < \rho_1 L_1 + \rho_3 L_3.$$

If the opposite condition is satisfied, as the temperature changes (decreases), the fastening load P applied to the collimating lens 110 increases, which may deteriorate the optical characteristics of the collimating lens 110.

On the contrary, when the reference temperature $t_0$ is relatively low, $\Delta t$ tends to be positive. In such a case, it is preferable that the following condition is satisfied:

$$\rho_2 L_2 > \rho_1 L_1 + \rho_3 L_3.$$

If the opposite condition is satisfied, as the temperature changes (increases), the fastening load P applied to the collimating lens 110 increases, which may deteriorate the optical characteristics of the collimating lens 110.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

Figure 5:
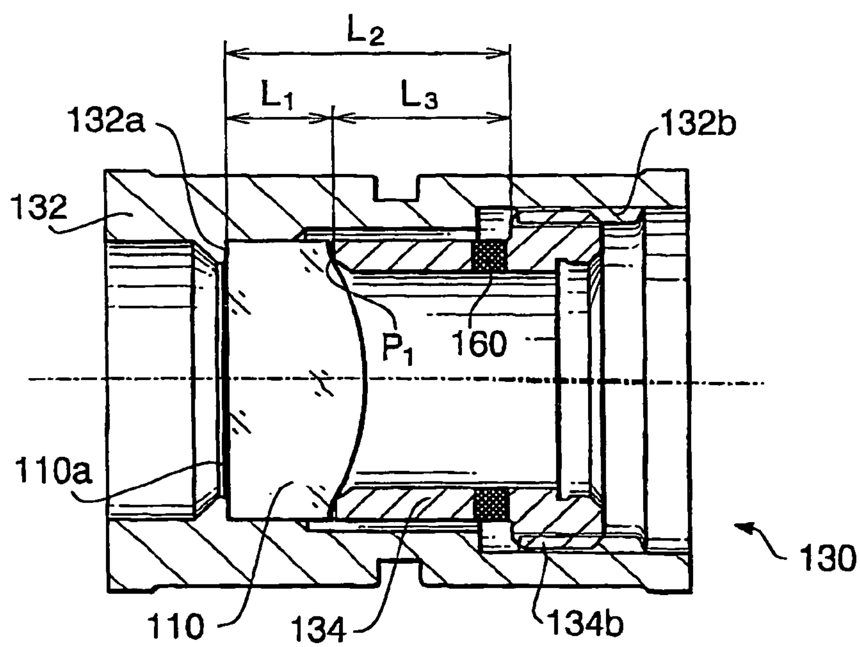
FIG. 5 shows a cross-sectional side view of a modification of the lens unit shown in FIG. 4.

FIG. 5 shows a modification of the above-described embodiment. In this modification, a part of the lens retainer ring 134 within the L3 part is replaced with elastic ring member 160. In such a structure, since the elasticity of the L3 part increase considerably, a difference between the deformation amount of the L2 part due to the temperature variation in the optical axis direction and the deformation amount of the sum of the changes of the $L_1$ part and $L_3$ part due to the same temperature variation in the optical axis direction can be made relatively large, which provides more selections of the materials and sizes of respective components.

The present disclosure relates to the subject matter contained in Japanese Patent Application No. 2003-078157, filed on Mar. 20, 2003, which is expressly incorporated herein by reference in its entirety.

What is claimed is:

1. A lens unit for a scanning device, comprising:

a frame having a hollow cylindrical shape, the frame being defined with a lens contact portion therein;

a lens accommodated in the frame contacting the lens contact portion defined in the frame; and a retainer accommodated in the frame to retain the lens in position, the retainer having a hollow cylindrical shape, one end side face of the retainer contacting a peripheral portion of the lens received by the frame, another end portion of the retainer being secured to the frame so that the retainer presses the lens toward the lens contact portion of the frame to fix the lens to the frame, wherein deformation of the frame, lens and retainer due to the load generated as the retainer presses the lens absorbs deformation of the frame, lens and retainer due to temperature change at least within a predetermined temperature range so that a fixed status of the lens with respect to the frame is not released due to the temperature change within the predetermined temperature range, wherein the lens has a linear expansion coefficient $\rho_1$, a longitudinal elastic modulus $E_1$, and a cross-sectional area $S_1$ orthogonal to an optical axis direction, wherein the frame has a linear expansion coefficient $\rho_2$, a longitudinal elastic modulus $E_2$, and a cross-sectional area $S_2$ orthogonal to the optical axis direction, in which the optical system is installed, wherein the retainer has a linear expansion coefficient $\rho_3$, a longitudinal elastic modulus $E_3$, and a cross-sectional area $S_3$ orthogonal to the optical axis direction, the retainer applying the lens with a load P, wherein the lens unit being configured to satisfy following condition:

$$\Delta t\{\rho_2 L_2 - (\rho_1 L_1 + \rho_3 L_3)\} < P\left(\frac{L_1}{E_1 S_1} + \frac{L_2}{E_2 S_2} + \frac{L_3}{E_3 S_3}\right),$$

wherein, $L_1$ represents a length of the lens from a contact point of the lens and the lens contact portion of the frame to a contact point of the lens and the retainer in the optical axis direction at a predetermined temperature $t_0$, $L_2$ represents a length of the frame from the contact point of the lens and the lens contact portion of the frame to a lens side end of the other end portion of the retainer at a predetermined temperature $t_0$, $L_3$ represents a length of the retainer from the contact point of the lens and the retainer to the lens side end of the other end portion of the retainer at a predetermined temperature $t_0$, wherein $L_2 = L_1 + L_3$, and wherein $\Delta t$ represents a change of temperature with respect to the predetermined temperature.

2. The lens unit according to claim 1, wherein the scanning device is a multibeam scanning device which simultaneously scans a plurality of light beams emitted by multiple light emitting elements on a scan target surface by dynamically deflecting the light beams by use of a deflecting system, the lens unit being used for each of the multiple light beams.

3. The lens unit according to claim 1, wherein the other end portion of the retainer is formed of a screw thread portion, and where an inner surface of the frame at a portion facing the other end portion of the retainer is formed of a screw thread portion to engage with the screw thread portion of the retainer.

4. The lens unit according to claim 1, wherein materials and lengths of the frame, lens and retainer are determined to satisfy a following condition:

$$\rho_2 L_2 = \rho_1 L_1 + \rho_3 L_3.$$

5. The lens unit according to claim 1, wherein the predetermined temperature range is a range from −20° C. to +70° C.

6. The lens unit according to claim 1, wherein the predetermined temperature $t_0$ is closer to the upper end of the predetermined temperature range than the lower end thereof, and wherein $\rho_2 L_2 < \rho_1 L_1 + \rho_3 L_3$.

7. The lens unit according to claim 1, wherein the predetermined temperature $t_0$ is closer to the lower end of the predetermined temperature range than the upper end thereof, and wherein $\rho_2 L_2 > \rho_1 L_1 + \rho_3 L_3$.

* * * * *